Nov. 15, 1949   M. G. GRIGSBY   2,487,868
UNDERWATER CAMERA CONTAINER WITH
EXTERNAL CAMERA CONTROL MEANS

Filed June 16, 1945   2 Sheets-Sheet 1

*INVENTOR.*
MAC G. GRIGSBY
BY *H. F. Woodward*
*ATTORNEY*

Nov. 15, 1949  M. G. GRIGSBY  2,487,868
UNDERWATER CAMERA CONTAINER WITH
EXTERNAL CAMERA CONTROL MEANS

Filed June 16, 1945  2 Sheets-Sheet 2

INVENTOR.
MAC G. GRIGSBY
BY
H. F. Woodward
ATTORNEY

Patented Nov. 15, 1949

2,487,868

UNITED STATES PATENT OFFICE 2,487,868

UNDERWATER CAMERA CONTAINER WITH EXTERNAL CAMERA CONTROL MEANS

Mac G. Grigsby, Gainesville, Fla.

Application June 16, 1945, Serial No. 599,889

1 Claim. (Cl. 95—11)

This invention relates to a device for making pictures under water and relates more particularly to an underwater camera box which is completely portable and maneuverable under water.

It is an object of the invention to make an improved under water camera box capable of making all types of angle shots, including shots directly upwardly toward the surface of the water.

The invention is capable of numerous forms and variations without departing from the essential features herein disclosed. It is therefore, the intent and desire that the embodiment shown herein be deemed illustrative and not restrictive, and that the patent shall cover all features of patentable novelty existing in the invention disclosed, reference being had to the claim rather than to the specific description herein to indicate the scope of the invention.

In the drawing forming a part of this application, similar characters of reference indicate corresponding parts in all the views.

Figure 1:
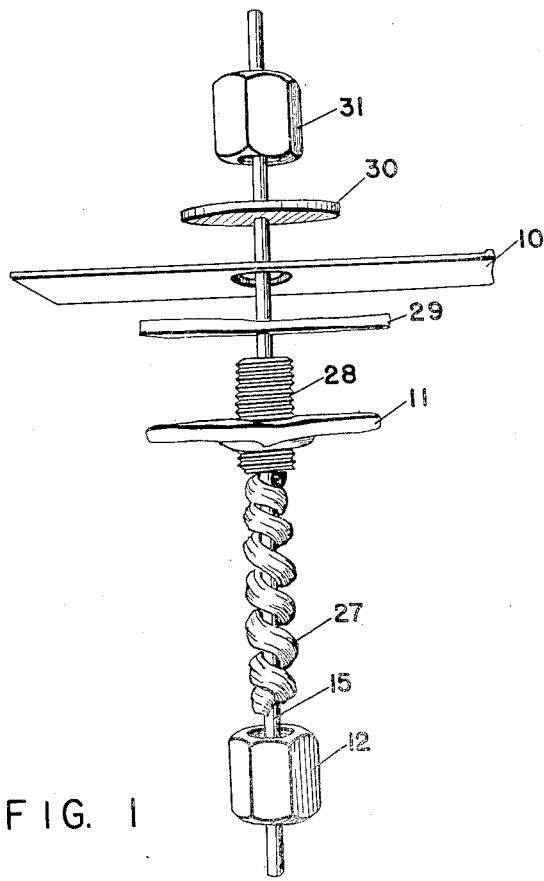
Figure 1 is an exploded view of the control rod and packing.
Figure 2:
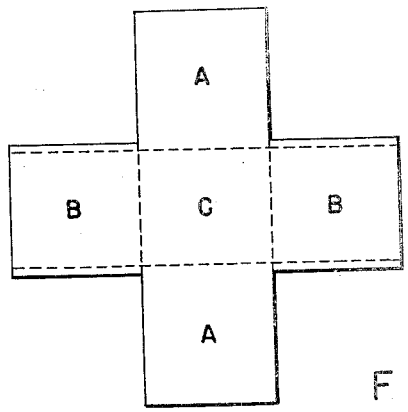
Figure 2 is a view of material as laid out for making the container a box.
Figure 3:
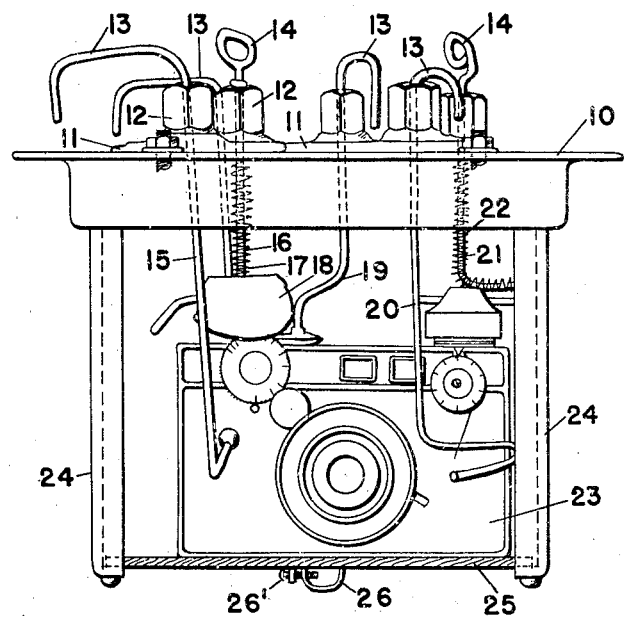
Figure 3 is a front elevational view of the top and the support for the platform showing the camera in place.
Figure 4:
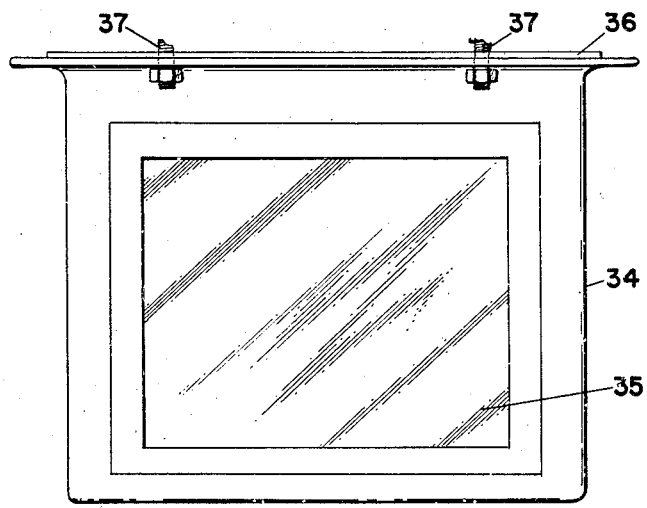
Figure 4 is a front elevational view of the camera box into which the camera support means shown in Figure 3 is adapted to be inserted.

The device in the broadest sense is a watertight box 34 with two panes of plate glass 35 set in parallel sides, with the camera 23 mounted in such a way that all camera controls are extended through water-tight packing boxes 12 in the cover 10 of the box. It is used by taking it in and under the water while wearing water goggles and operating it just as one would any camera out of the water. The cameraman looks through the two parallel panes of glass, locating his subject through the camera's view finder and range finder in the usual manner.

One of the important features of the submersible camera is in the easily and economically constructed packing boxes through which the movable controls of the camera extend. These may be made of a one-quarter inch standard plumbing pipe nipple and two pipe caps. A one-eighth inch hole is drilled in the center of each pipe cap to accommodate the one-eighth inch bronze welding rod which is used for the extended controls of the camera. Welding rod was chosen because it is strong and tough enough to do the job, and at the same time, is malleable enough that it can be shaped by the use of pliers and hammer. The finished packing box with control rod through it is stuffed with one-eighth inch graphited packing or similar material which is used in packing propeller shafts, washing machines, pumps, etc. A sufficient amount of the packing 27 is wound around the control rod 15 and pushed down into the pipe nipple 28 so that there will be a snug fit when the two caps 12 and 31 are screwed on tight. The packing box assembly is mounted through a hole in the box cover by use of a one-quarter inch waist nut 11, also a standard plumbing fitting, a rubber washer 29 cut to appropriate size, and a metal washer 30 approximately one-eighth of an inch thick. The packing box seals itself against the cover when the caps at each end are tightened. The number of these packing boxes needed will vary with different types of cameras. Six are needed for extending to the controls of the camera shown.

Heavy and rigid material is needed for the construction of a removable water-tight cover which can be sealed by the pressure of six one-quarter inch bolts three-quarters of an inch long and a rubber gasket. This seal is similar to that used for the face plates of diving helmets. This problem is solved by making the cover on a frame of one-inch angle iron which fits loosely on and into a second slightly larger frame of the same general construction which forms the top rim of the box. A watertight seal is made by bolting the two frames together with bolts 37 spaced around the top, and a rubber gasket 36 is positioned between the two frames. The gasket used should be fairly narrow and should be fitted within the rectangular area delineated by the bolt holes.

If the pressure of the bolts 37 is distributed over the area of a larger gasket the amount of water pressure the assembly will withstand is materially reduced.

Each frame may be made by welding together at the corners four pieces of one-inch angle iron which have been cut at a forty-five degree angle. Eight pieces are required for the two frames.

A piece of twenty gauge galvanized sheet iron or other suitable material is cut one-quarter of an inch larger each way than the inside of the smaller frame and is welded to the frame in a water-tight seam completely around its four sides. This frame, with top welded on, forms the cover of the box. Through it are bored the six holes nine-sixteenths of an inch in diameter through which the previously described packing boxes are mounted.

The camera is mounted on platform 25 made of one-quarter inch plywood or any other suitable material and suspended from the cover by four means such as strips of angle iron 24, one at each corner. These pieces of angle iron may be made from twenty gauge sheet metal. They are bent into right angle form by placing them between two pieces of the heavier one-inch angle iron before the frames are welded and closing them in a vise so that the lighter strip is bent to conform with the shape of the two heavier pieces. A piece of metal the same size as the platform is fastened at the other end of the angle irons in the same manner. Holes are later bored in this piece matching the holes in the cover of the box, and this platform sub-assembly is included in the final assembly when the packing boxes are installed so that the cover and suspended platform are fastened together in one solid unit. The packing boxes furnish adequate support for the platform on which the camera rests. This system of mounting the camera makes it very convenient to install or remove the camera. It also affords special protection to the camera in the event of accidental leakage. Several ounces of water would have to leak into the box before the camera could be reached regardless of the position of the box in the water.

The camera is mounted on the platform with its back parallel to and nearly flush with the edge of the platform. It is desirable that the back of the camera be very close to the edge in order to reduce the distance the camera back will be from the glass in the final assembly. The closer the camera is to the glass the more convenient it will be to use the range and view finders.

The camera may be secured in place by any suitable means for example by a camera case retaining bolt screwed through a hole in the platform and into the tripod socket of the camera. The location of such an opening in the platform can be determined by measurement after the camera position has been determined. A shallow U-shaped metal bracket 26 with the arms of the U passing through openings in the platform and contacting the camera at points approximately two and one-half inches from the tripod socket will prevent the camera from rotating on its mounting. This bracket may be held in place by any suitable means for example by a screw or bolt not shown tightened from the bottom side of the platform. This method of attachment allows the bracket to be lowered out of the way when installing or removing the camera. In order to keep over-all size at a minimum very little extra space is provided in the box. It will be found that there is just sufficient room to slide the camera between the two back supports of the platform and under the film winding and focusing controls. These two controls can be pulled up through the packing boxes slightly in order to get the camera under them. It may be necessary to cut a slight recess under the film rewinding knob in order to keep it from binding against the platform when film is advanced.

The spacing of the packing boxes on the cover is controlled; first by the space available; and second by the manner these vertically extending, rotating control rods are to be coupled to the existing controls of the camera.

Directions front and back, right and left, will be in relation to the camera as you look down on it after it has been mounted on the platform. The shutter cocking control is placed one and three-quarters of an inch in front of the cocking lever which is on the face of the camera. The control rod 15 extends vertically to a point even with the end of the downward extending cocking lever at which point it is bent at right angles forming a lever which will cock the shutter when the control is turned. That portion of each control rod which extends outside the box is bent into a lever or handle 13 as may be desired. The shutter release control is centered three-quarters of an inch behind the shutter release of the camera. It extends downward to a point just above the shutter release plunger at which place it is bent at right angles to extend to a point just above the release plunger, and then in a downward spiral in such a manner that when the control is turned the spiral will rub across the top of the plunger with an increasing downward pressure until the shutter is tripped. The degree of spiral can be varied to suit the operator's desire for a slow or quick trigger on his shutter. Approximately fifteen degrees of turn is required to trip the shutter on the box shown in the drawing. The focusing control is located five-eighths of an inch in front of the center of the knurled focusing ring on the camera. This control consists of a rubber crutch tip 18 mounted as a wheel with the control rod as an axle. The crutch tip fits over a metal cylinder one inch in diameter which is fastened to the end of the control rod 16. An expanding spring 17 is placed on the control rod between the underside of the packing box and the crutch tip mounting in order to assure constant pressure for the friction contact of this control. The film release control 19 is mounted at a forty-five degree angle to the front and left of the film release button on the top of the camera. It extends downward, across and finally downward to a point just above and almost touching the release. A slight turn and downward movement of the control releases the film for winding. The film winding control is centered directly over the film winding knob of the camera. It is shaped in the form of a T so that the top bar of the T will engage a slot which is cut across the top of a cap fitted over the film winding knob.

An expanding spring can be used here in the same manner as on the focusing control. The diaphragm control is mounted to the left of the right side of the diaphragm control ring on the lens of the camera. It extends downward to a point even with the center of the lens and then at right angles, and is then bent into a horizontally extending arc of a circle with the vertical shaft of the control as the center of the circle. This control permits change of the diaphragm opening with the lens hood in place. It is used by turning until the end of the control engages one of the buttons on the diaphragm ring, and holding the control in position while turning the focusing control as needed. The diaphragm control is then returned to the back position so that it will not interfere with the field of view of the lens.

Shutter cock, shutter release, and diaphragm controls may be equipped with spring returns made by attaching small coil springs to tapped collars placed on the control rods just below the packing box. One end of the spring is fastened to a long set screw in the collar and the other end to any convenient place in the top part of the assembly. Special washers cut from twenty-two gauge sheet metal with tabs bent down to limit the motion of these controls will also provide a place to anchor the springs.

The shape and dimensions of a piece are shown in Figure 1. Two additional pieces are needed to make the frames in which the two pieces of one-quarter of an inch plate glass 35 are set. The box is shaped by bending the four outside parts A and B upward at right angles to the center rectangle C which forms the bottom of the box, and then lapping over on the outside the one-half inch strips at each of the four edges to provide for solder joints.

A rectangular opening three inches by four and one-quarter inches is cut in each of the two larger sides of the box. These openings should be midway between the ends of the box and one and one-half inches from the bottom. A frame mark is scored around these openings one-half inch from the edge of the opening and the metal cut diagonally at each corner of the opening to the corner of the scored frame. These one-half inch wide strips at the borders of the frame openings are then bent outward at right angles increasing the size of the openings to four inches by five and one-quarter inches. These strips will later be bent on back to the surface of the box holding in place the frames in which the glass is to be set.

Two frames for the glasses may be made from the pieces measuring six inches by seven and one-quarter inches. A piece four inches by five and one-quarter inches is cut out of the center of each piece so that there is provided a flat rectangular frame of material one inch wide. The outside half-inch of each side of the frame is bent up at right angles, a cut first being made at each corner to form a one-half inch square tab that can be bent around to form a lapped box-corner. At this point, these frames, were it not for the fact that the centers have been cut out, would have the shape of shallow trays measuring five inches by six and one-quarter inches by one-half inch deep.

The "bottomless trays" are now fitted over the openings in the box, and the projecting strips of the box bent on over and down tight holding the frame in place. This type of construction will give a great deal of rigidity to the box sides and to the frames. The large angle frame described above is now fitted flush into the top of the box and brazed into place by a watertight seam entirely around the top edge of the box. All other seams and joints are then soldered. It is not necessary to solder inside the glass frames, as the cement which holds the glass in place will cover that area.

What I claim is:

In a portable underwater camera container having windows in two opposite sides and an open top, a water-tight cover for the top, means for supporting a camera between the windows, said means attached to and movable with the top and mechanical operating rods extending through the top, said operating rods including a focus control rod having a rubber means on one end and a substantially constant pressure means mounted around the focus control rod.

MAC G. GRIGSBY.

REFERENCES CITED

The following references are of record in the file of this patent:

UNITED STATES PATENTS

| Number | Name | Date |
| --- | --- | --- |
| 616,999 | Wight | Jan. 3, 1899 |
| 631,222 | Mason | Aug. 15, 1899 |
| 685,463 | Walkins | Oct. 29, 1901 |
| 1,122,104 | Gruen | Dec. 22, 1914 |
| 1,179,330 | Leithold | Apr. 11, 1916 |
| 1,661,364 | Fairchild | Mar. 6, 1928 |
| 1,810,302 | Stiles | June 16, 1931 |
| 2,001,682 | Jackman | May 14, 1935 |
| 2,237,387 | Nerwin | Apr. 8, 1941 |

FOREIGN PATENTS

| Number | Country | Date |
| --- | --- | --- |
| 117,841 | Great Britain | Feb. 7, 1918 |
| 161,780 | Great Britain | Apr. 21, 1921 |
| 744,934 | France | Apr. 28, 1933 |

OTHER REFERENCES

"Undersea Cinematography," article by Johnson in Journal of the Soc. of Motion Picture Engineers, vol. 32, January 1939. Published in Easton, Pa., pp. 11-16 cited.